United States Patent [19]
Esmay

[11] 3,840,100
[45] Oct. 8, 1974

[54] UNIDIRECTIONAL COUPLING APPARATUS
[75] Inventor: Edward N. Esmay, Brighton, N.Y.
[73] Assignee: Xerox Corporation, Stamford, Conn.
[22] Filed: Feb. 2, 1973
[21] Appl. No.: 328,991

[52] U.S. Cl............... 192/45, 192/67 A, 64/17 SP
[51] Int. Cl................................................ B60l 5/00
[58] Field of Search ...... 192/45, 110 R, 67 A; 64/4, 64/6, 7, 9 R, 17 SP, 3, 8

[56] References Cited
UNITED STATES PATENTS
3,279,571  10/1966  Wassileff........................... 192/45 X Primary Examiner—Samuel Scott
Assistant Examiner—Frank H. McKenzie, Jr.
Attorney, Agent, or Firm—H. Fleisher; J. J. Ralabate; C. A. Green

[57] ABSTRACT

An apparatus in which a pair of rotary journaled shaft members are connected to one another for unidirecitonal rotation substantially in unison.

The foregoing abstract is neither intended to define the invention disclosed in the specification, nor is it intended to be limiting as to the scope of the invention in any way.

8 Claims, 4 Drawing Figures

UNIDIRECTIONAL COUPLING APPARATUS

BACKGROUND OF THE INVENTION

This invention relates generally to an electrophotographic printing machine, and more particularly concerns an apparatus adapted to couple a pair of rotary journaled shaft members to one another for unidirectional rotation substantially in unison.

Heretofore, the various rotative components of printing machines have been mounted substantially fixedly to the drive system. It is readily apparent that in some instances it is necessary to have a coupling arrangement wherein the interconnected shaft members rotate only in one direction substantially in unison with one another while the shaft members remain free to rotate relative to each other in the other direction. Furthermore, it is desirable for some components of the printing machine to rotate at a substantially constant speed with little or no slip therebetween. This is particularly significant with regard to the feed roll utilized in the sheet feeding apparatus of the printing machine. The feed roll is mounted rotatably to advance successive sheets of support material therefrom in seriatim. Preferably, the feed roll is designed to rotate in one direction and is connected to the drive shaft by a unidirectional coupling. The coupling is adapted to permit easy removal of the feed roll from the drive shaft without the necessity of extensive manipulations or costly manual operations. It would, therefore, be advantageous to have the feed roll, amongst other components, coupled to the main drive system in a manner facilitating the ready engagement and disengagement thereof while permitting unidirectional rotation.

Conventional clutch couplings lack the requisite flexibility, simplicity and accuracy. In general, a clutch coupling provides bidirectional rotation rather than unidirectional rotation. Moreover, conventional couplings frequently do not compensate for the angular and lateral misalignment between the interconnected shaft members. Clutch couplings are designed to transmit torque without slip. For example, the jaw clutch has a plurality of square jaws for bidirectional rotation, or spiral jaws for unidirectional rotation. Friction clutches are designed to reduce coupling shock by slipping during the engagement period. However, this feature is not desirable in printing machine components such as the feed roll. In addition, friction clutches are generally designed for bidirectional rotation rather than unidirectional rotation. Other types of conventional clutches are the cone clutch and the disc clutch which are examples of axial clutches. A disc clutch may consist of either a single plate or a multiple disc. A spring force holds the disc clutch in engagement. However, this is a friction type clutch, wherein the frictional force is regulated by the utilization of a spring force operating in conjunction with the discs. A cone clutch depends upon the peripheral circumferential surface thereof for driving one shaft member relative to the other shaft member. If the drive torque exceeds the frictional torque engaging the clutch, slip may occur between interconnected shaft members. Other types of clutches are rim clutches, which employ a band or block in contact with the rim of a drive shaft and overrunning clutches, which employ the wedging action of a roller to engage in one direction and to rotate freely in the other direction. An overruning clutch utilizes rollers or balls mounted between an outer sleeve and an inner member having cam flats machined around the periphery thereof. Driving action is obtained by wedging the rollers between the outer sleeve and the cam flats. A detailed description of these clutches, as well as others, is provided in Mark's Mechanical Engineers Handbook, 6th Edition, pages 8–50 through 8–52, inclusive. The foregoing types of clutch arrangements all appear to work satisfactorily for their specific application. However, when these clutches are utilized in conjunction with components of an electrophotographic printing machine, they all appear to possess limitations which do not render them suitable for the particular application. Furthermore, the unidirectional couplings utilized in an electrophotographic printing machine must be capable of connecting shaft members misaligned laterally and/or angularly, as well as providing for unidirectional rather than bidirectional rotation.

It is, therefore, the primary object of the present invention to improve the apparatus utilized to couple a pair of shaft members for unidirectional rotation.

SUMMARY OF THE INVENTION

Briefly stated, and in accordance with the present invention, there is provided an apparatus connecting a pair of rotary journaled shaft members to rotate unidirectionally substantially in unison with one another.

In accordance with the present invention, this is accomplished in the present instance by coupling means adapted to rotatably connect one of the shaft members to the other of the shaft members. Means, cooperating with the coupling means, are provided for enabling one of the shaft members to rotate relative to the other shaft member in one direction, while substantially preventing relative rotation therebetween in the other direction. Thus, the pair of shaft members are free to rotate relative to each other in one directin, while being coupled to rotate in unison with one another in the other direction.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF INVENTION

Figure 1:
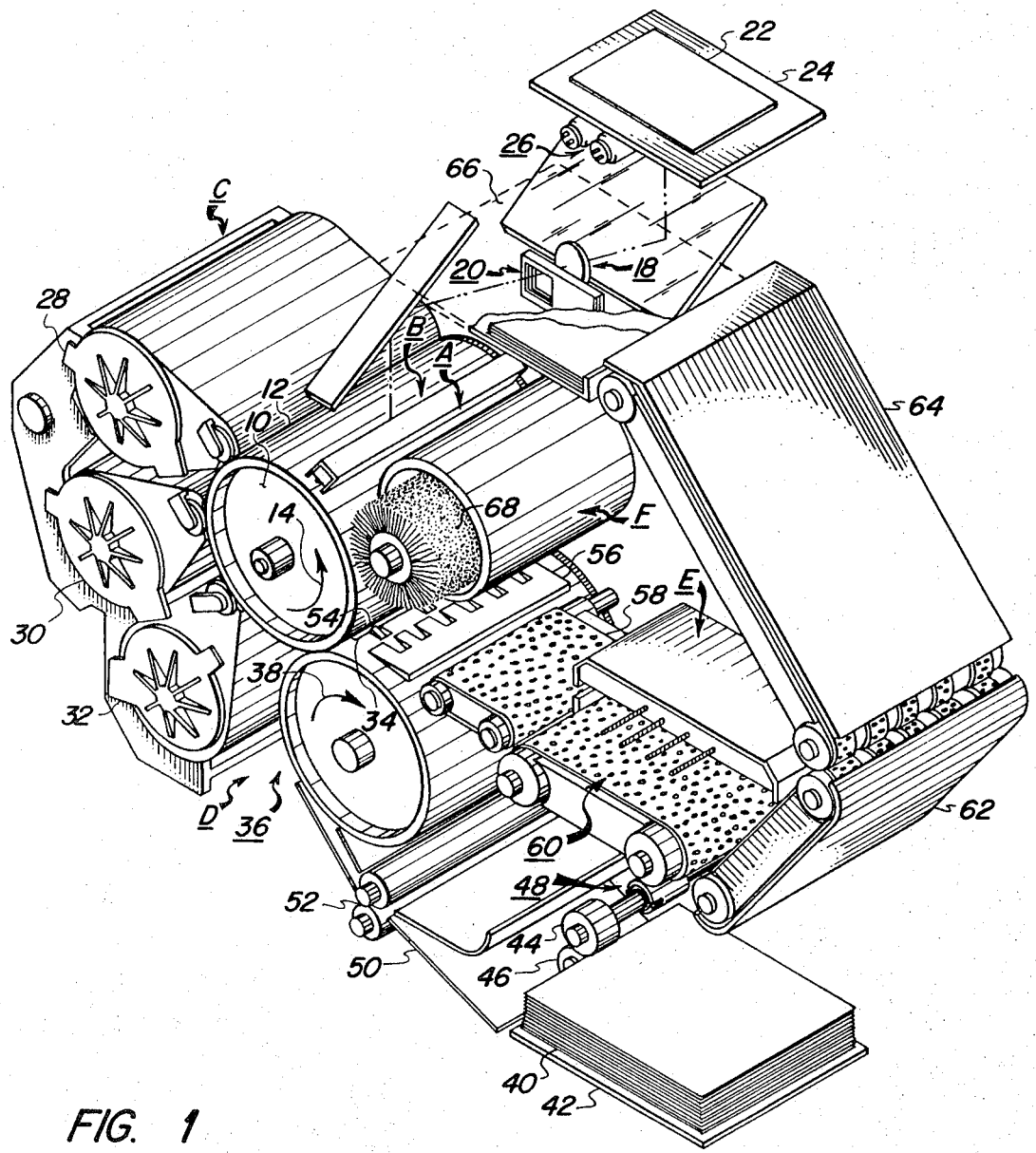
FIG. 1 schematically illustrates an electrophotographic printing machine embodying therein the features of the present invention.

With continued reference to the drawings wherein like reference numerals have been used throughout to designate like elements, FIG. 1 schematically illustrates an electrophotographic printing machine in which the present invention may be incorporated. The electrophotographic printing machine depicted schematically in FIG. 1 illustrates the various components utilized therein for producing multi-color copies from a colored original. Although the unidirectional coupling apparatus of the present invention is particularly well adapted for use in an electrophotographic printing machine, it should become evident from the following description that it is equally well suited for use in a wide variety of machines and is not necessarily limited in its application to the particular embodiment shown therein.

The printing machine illustrated in FIG. 1 employs a photoconductive member having a drum 10 mounted rotatably within the machine frame (not shown). Photoconductive surface 12 is suitably secured to the exterior circumferential surface of drum 10. One type of suitable photoconductive material is disclosed in U.S. Pat. No. 3,655,377 issued to Sechak in 1972. A series of processing stations are disposed such that as drum 10 rotates in the direction of arrow 14 it passes sequentially therethrough. Drum 10 is driven at a predetermined speed relative to the other machine operating mechanisms from a common drive motor (not shown). The various machine operations are coordinated with one another to produce the proper sequence of events at the appropriate processing station.

First, drum 10 moves photoconductive surface 12 through charging station A. Charging station A has positioned thereat a corona generating device indicated generally at 16. Corona generating device 16 extending in a generally transverse direction across photoconductive surface 12. In this manner, corona generating device 16 charges photoconductive surface 12 to a relatively high substantially uniform potential. Preferably, corona generating device 16 is of the type described in U.S. Pat. No. 2,778,946 issued to Mayo in 1957.

Next, drum 10 is rotated to exposure station B where the charged photoconductive surface 12 is exposed to a color filtered light image of the original document. Exposure station B includes thereat a moving lens system, generally designated by the reference numeral 18, and a color filter machanism shown generally at 20. A suitable moving lens system is disclosed in U.S. Pat. No. 3,062,108 issued to Mayo in 1962, and a suitable color filter mechanism is described in copending application Ser. No. 830,282 filed in 1969. As shown in FIG. 1, an original document 22, such as a sheet of paper, book or the like, is placed face down upon transparent viewing platen 24. Lamp assembly 26, filter mechanism 20, and lens system 18 are moved in a time relation with drum 10 to scan successive incremental areas of original document 22 disposed upon platen 24. This produces a flowing light image of original document 22 which is projected onto photoconductive surface 12. During exposure, filter mechanism 20 interposes selected color filters into the optical light path of lens 18. The appropriate color filter operates on the light rays passing through lens 18 to record an electrostatic latent image on photoconductive surface 12 corresponding to a preselected spectral region of the electromagnetic wave spectrum, hereinafter referred to as a single color electrostatic latent image.

After exposure, drum 10 rotates the single color electrostatic latent image recorded on photoconductive surface 12 to development station C. Development station C includes thereat three individual developer units, generally indicated by the reference numerals 28, 30 and 32, respectively. A suitable development station employing a plurality of developer units is disclosed in copending application Ser. No. 255,259, filed in 1972. Preferably, each of the developer units are of a type referred to generally as magnetic brush developer units. A typical magnetic brush developer unit utilizez a magnetizable developer mix having carrier granules and toner particles. The toner particles are continually brought through a directional flux field to form a brush thereof. The electrostatic latent image recorded on photoconductive surface 12 is developed by bringing the brush of developer mix into contact therewith. Each of the respective developer units contain discretely colored toner particles corresponding to the complement of spectral region of the wave length of light transmitted through filter 20, e.g., a green filtered electrostatic latent image is rendered visible by depositing green absorbing magenta toner particles thereon, blue and red latent images are developed with yellow and cyan toner particles, respectively.

Drum 10 is next rotated to transfer station D where the powder image adhering electrostatically to photoconductive surface 12 is transferred to a sheet of final support material 34. Final support material 34 may be, amongst others, plain paper or a thermoplastic sheet. A bias transfer roll, shown generally at 36, recirculates support material 34 and is biased electrically to a potential of sufficient magnitude and polarity to attract electrostatically toner particles from the latent image recorded on photoconductive surface 12 to support material 34. A suitably electrically biased transfer roll is described in U.S. Pat. No. 3,642,677 issued to Langdon et al. in 1971. Transfer roll 36 rotates in the direction of arrow 38 in synchronism with drum 10 (in this case at substantially about the same angular velocity). Inasmuch as support material 34 is secured releasably on transfer roll 36 for movement in a recircularting path therewith, successive toner powder images may be transferred thereto in superimposed registration with one another.

Support material 34 is advanced from a stack 40 disposed on tray 42. Feed roll 44, in operative communication with retard roll 46, advances and separates the uppermost sheet from stack 40 disposed on tray 42. Feed roll 44 is connected to the drive system (not shown) of the electrophotographic printing machine by means of the unidirectional coupling apparatus, indicated generally at 48, of the present invention. Coupling apparatus 48 will be described hereinafter in greater detail with reference to FIGS. 2 through 4, inclusive. The advancing sheet moves into chute 50 which directs the sheet into the nip of register rolls 52. Thereafter, gripper fingers 54, mounted on transfer roll 36, secure releasably thereon support material 34 for movement in a recirculating path.

After the toner powder images have been transferred to support material 34, gripper fingers 54 release support material 34 permitting stripper bar 56 to separate support material 34 from transfer roll 36. Thereafter, support material 34 is advanced on endless belt conveyor 58 to fixing station E where a fuser, indicated generally at 60, coalesces the transferred powder image to sheet 34. One type of suitable fuser is described in U.S. Pat. No. 3,498,592 issued to Moser et al. in 1970. After the fusing process, support material 34 is advanced by endless belt conveyors 62 and 64 to catch tray 66 for subsequent removal therefrom by the machine operator.

Although a preponderance of toner particles are transferred to support material 34, invariably some residual toner particles remain on photoconductive surface 12 after the transfer of the toner powder image therefrom. These residual toner particles are removed from photoconductive surface 12 as it passes through cleaning station F. Here the residual toner particles are first brought under the influence of a cleaning corona generating device (not shown) adapted to neutralize the electrostatic charge remaining on the toner particles. The neutrailized toner particles are then mechanically cleaned from photoconductive surface 12 by rotatably mounted fibrous brush 68. A suitable brush cleaning device is described in U.S. Pat. No. 3,590,412 issued to Gerbasi in 1971. Rotatably mounted brush 68 is positioned at cleaning station F and arranged to be in contact with photoconductive surface 12. In this manner, residual toner particles remaining on photoconductive surface 12, after each transfer operation, are readily removed therefrom.

It is believed that the foregoing description is sufficient for purposes of the present application to illustrate the general operation of an electrophotographic printing machine embodying the teachings of the present invention.

Figure 2:
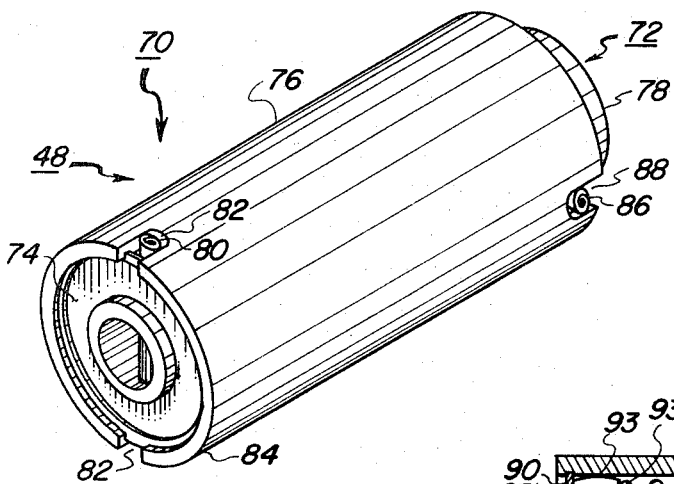
FIG. 2 is a perspective view showing the coupling apparatus utilized in the FIG. 1 printing machine.

Referring now to the specific subject matter of the present invention, FIG. 2 depicts an apparatus adapted to couple a pair of rotary journaled shaft members for unidirectional rotation in unison with one another. Coupling apparatus 48 is illustrated in the FIG. 1 printing machine as connecting the shaft of feed roll 44 with the printing machine drive section (not shown). Preferably, the electrophotographic printing machine shown in FIG. 1, includes three basic drive sections; lower drives, lens drives and upper drives. The lower drives are a removable package suspended from the vertical frame (not shown) located under and rearwardly of endless belt conveyor 58 and the endless belt conveyor of fuser 60. It is driven from the main drive shaft by a suitable timing belt. Power is fed to feed roll 44 by coupling 48 and to register roll 52 by a suitable coupling (not shown). The lens drive comprises a pair of substantially parallel shafts connected to one another by a pair of gears. The lower shaft has a motor and a suitable coupling on one end thereof. A metal bellows coupling on the drive shaft rotates the transfer roll. The upper shaft has mounted thereon drum 10 and a cable drive for moving lens 18. The upper drive system includes appropriate belts, shafts, and couplings located on the machine which drive the various conveyors thereof.

Coupling apparatus 48 is depicted in perspective in FIG. 2, and includes coupling means, indicated generally by the reference numeral 70, and means, indicated by the reference numeral 72, for enabling one of the shaft members to rotate relative to the other shaft member in one direction while preventing relative rotation therebetween in the other direction so as to insure rotation in unison. Coupling means 70 includes a frame member 74, a sleeve member 76 mounted pivotably on frame member 74, and a housing member 78 mounted pivotably on sleeve member 76. Frame member 74 is arranged to be mounted on one end of one shaft member, e.g., the drive shaft member, while housing member 78 is adapted to be mounted on the other shaft member.

Figure 3:
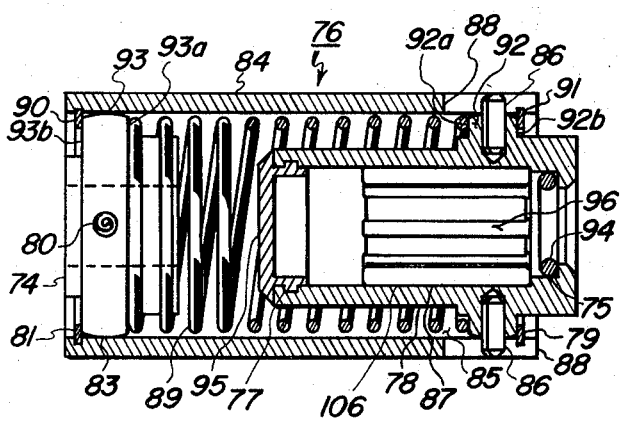
FIG. 3 is a sectional view depicting the FIG. 2 coupling apparatus.

Turning now to FIG. 3, frame member 74 is of a substantially tubular configuration and has a pair of substantially diametrically opposed elongated pins 80 extending in a substantially outwardly direction from the circumferential surface thereof. Pins 80 may be secured to frame member 74 by being suitably press fit therein or, in lieu thereof, by being adhesively secured thereto. Sleeve member 76 is also of a tubular configuration and includes a pair of diametrically opposed slots 82 (FIG. 2) in one marginal end region 84 thereof. Sleeve member 76 is adapted to interfit telescopically over frame member 74 with pins 80 in frame member 74 passing through slots 82 therein. Slots 82 are of a size sufficient to enable frame member 74 to pivot about pin member 80. This permits a shaft member misaligned from the longitudinal axis of coupling apparatus 48 to be mounted by pivoting frame member 74 about pin member 80. Sleeve member 76 is also adapted to interfit telescopically over housing member 78. Housing member 78 is also substantially of a tubular configuration. A pair of substantially diametrically opposed pins 86 extend in an outwardly direction from the circumferential surface of housing member 78. Pins 86 may also be secured to housing member 78 by being suitably press fit therein or, in lieu thereof by being adhesively secured thereto. Sleeve member 76 includes a second pair of slots 88 diametrically opposed from one another in a plate substantially normal to the plane of slots 82. Slots 88 are located in the opposed marginal end portion of sleeve member 76. Pins 86 are arranged to pass through slots 88 in sleeve member 76. The longitudinal axis of pins 86 is substantially normal to the longitudinal axis of pins 80. In this way, sleeve member 76 may pivot about pins 86 to provide an additional degree of freedom relative to housing member 78. Thus, it is evident that an angularly, or laterally misaligned shaft member may be mounted slidably in frame member 74 by rotating frame member 74 about pins 80 and, in turn, rotating sleeve member 76 about pins 86. Slots 88 are of a suitable size to permit sleeve member 76 to pivot readily freely about pins 86.

Biasing means or helical spring 89 is adapted to resiliently urge frame member 74 to be disposed at one marginal end region 83 of sleeve member 76, while maintaining housing member 78 disposed at the other marginal end region 85 of sleeve member 76. One end of spring 89 engages interior surface 93a of flange 93 on frame member 74, while the other end of spring 89 engages the interior surface 92a of flange 92 on housing member 78. Retaining ring 90 contacts the exterior surface 93b of flange 93 and is affixed in groove 81 of sleeve member 76. Similarly, retaining ring 91, disposed in groove 79 of sleeve member 76, contacts the exterior surface 92b of flange 92. Thus, spring 89 exerts a force on housing member 78 such that flange 92 thereof engages retaining ring 91 and is, thereby, secured in position. In addition, spring 89 exerts a force on frame member 74 such that flange 93 thereof contacts retaining ring 90 and is, thereby, secured in position. Cap 95 is mounted on the interior open end 77 of housing member 78. Seal 94 is positioned in groove 75 of housing member 78. Both cap 95 and seal 94 are arranged to prevent contamination of enabling and preventing means 72, which in the preferred embodiment disclosed herein is a bearing member, indicated generally by the reference numeral 96. Support portion 87 of housing member 78 has mounted therein bearing member 96. Bearing member 96 is adapted to receive the other shaft member therein and is arranged to permit the pair of shaft members to rotate relative to one another in one direction while coupling the pair of shaft members to rotate in unison with one another in the other direction. Bearing member 96 may be press fit into support portion 87, or in lieu thereof, have the outer circumferential surface thereof adhesively secured to the inner circumferential surface 106 of support portion 87. One type of suitable bearing member 96 is of the type described in the art as an overrunning roller clutch, such a clutch is made by the Torrington Company.

Figure 4:
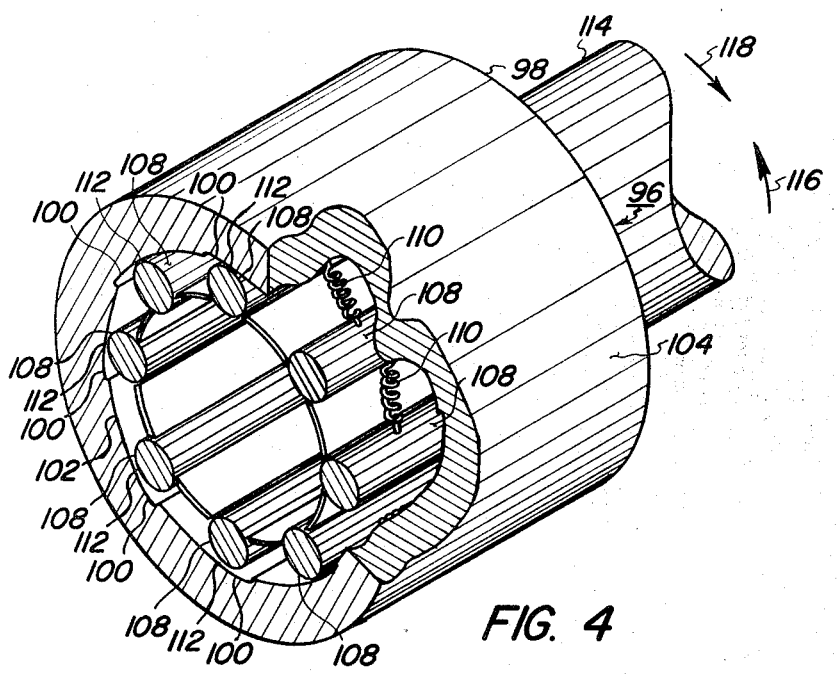
FIG. 4 is a fragmentary, sectional, perspective view showing the bearing member of the FIG. 2 coupling apparatus.

Referring now to FIG. 4, which schematically illustrates the operation of bearing member 96, i.e., when it is of the type heretofore referred to as an overrunning roller clutch. Bearing member 96 includes an outer race 98 having a plurality of spaced open ended compartments 100 disposed in the interior circumferential surface 102 thereof. The exterior circumferential surface 104 of outer race 98 is mounted on the inner circumferential surface 106 of support portion 87. A plurality of cylindrical members, or roller bearings 108 are mounted in compartments 100. One roller bearing 108 is mounted in each compartment 100. Biasing means or a spring 110, operatively associated with each other bearing 108, resiliently urges the respective roller bearing 108 in an outwardly direction along chamfered surface 112 of compartments 100. Thus, as shaft member 114 rotates in the direction of arrow 118, roller members 108 advance along chamfered surface 112 until they are locked in position by the interference between outer race 98 and shaft 114. This, in turn, locks shaft 114 with the shaft member secured to frame member 74. Thus, shaft member 114 rotates substantially in unison with the shaft member mounted in frame member 74. Contrawise, when shaft member 114 rotates in the direction of arrow 116 roller members 108 are moved into compartments 100 and are free to rotate about their respective axes. Hence, shaft member 114 will not rotate relative to the shaft member secured in frame member 74.

It is, therefore, evident that when a shaft member is disposed in bearing member 96 and a second shaft member is disposed in frame member 74, both shaft members will rotate in unison with one another when the shaft member disposed in bearing member 96 rotates in a direction such as to lock the roller members between the shaft members and the outer race. However, when the shaft member rotates in the opposed direction, wherein the roller members are free to rotate about their respective axes, the shaft member disposed in bearing member 96 will rotate freely relative to the shaft member located in frame member 74. This is particularly signficant when used in conjunction with feed roll 44. Feed roll 44 is connected to the drive system of the electrophotographic printing machine by coupling apparatus 48. The shaft of feed roll 44 is mounted in frame member 74, and the shaft associated with the drive system of the printing machine is mounted in bearing member 96. In this way, feed roll 44 will rotate only in one direction, i.e., the apporopriate direction for advancing the uppermost sheet from stack 40. Moreover, feed roll 44 will rotate at substantially the same angular velocity as the drive shaft with substantially no slip therebetween.

In recapitulation, it is evident that a pair of misaligned shaft members may be interconnected with one another for unidirectional rotation in unison. The shaft members may be misaligned from each other and still be interconnected by pivoting the frame member relative to the bearing member in sufficient amounts as provided by the pivoting arrangement therebetween. Furthermore, a bearing member mounted in the support portion of the housing member is adapted to permit relative rotation between the shaft members in one direction while preventing such rotation in the opposed direction so as to enable the pair of shaft members to rotate in unison in the preferred direction.

Thus, it is apparent that there has been provided, in accordance with the present invention, a unidirectional coupling apparatus that fully satisfies the objects, aims and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An apparatus connecting a pair of rotary journaled shaft members for unidirectional rotation substantially in unison, including:

means for coupling rotatably one of the shaft members to the other of the shaft members, said coupling means comprises a frame member arranged to be mounted on one of the shaft members, a sleeve member mounted pivotably on said frame member, a housing member mounted pivotably on said sleeve member, said housing member being adapted to pivot in a direction substantially normal to the direction said sleeve member pivots relative to said frame member, and biasing means for resiliently urging said frame member to be disposed in the region of one marginal edge portion of said sleeve member, while maintaining said housing member disposed in the region of the other marginal edge portion of said sleeve member; and means, cooperating with said coupling means, for enabling one of the shaft members to rotate relative to the other of the shaft members in one direction, while substantially preventing relative rotation therebetween in the other direction so that the pair of shaft members rotate in unison with one another.

2. An apparatus as recited in claim 1, wherein said enabling and preventing means includes a bearing member mounted in said housing member and adapted to receive the other shaft member therein, said bearing member being arranged to permit the pair of shaft members to rotate relative to one another in one direction, while coupling the pair of shaft members to rotate in unison with one another in the other direction.

3. An apparatus as recited in claim 2, wherein:

said frame member includes a substantially tubularly configured member having a first pair of substantially diametrically opposed pins extending in an outwardly direction from the circumferential surface thereof;

said sleeve member includes a substantially tubularly configured member adapted to interfit telescopically over said frame member, said sleeve member having a first pair of substantially diametrically opposed slots in the region of one marginal edge portion thereof arranged to interfit with the first pair of pins of said frame member permitting said frame member to pivot relative to said sleeve member, said sleeve member having a second pair of substantially diametrically opposed slots in a plane substantially normal to the plane of the first pair of slots in the region of the other marginal edge portion thereof; and said housing member includes a substantially tubularly configured member having a second pair of substantially diametrically opposed pins extending in an outwardly direction from the circumferential surface thereof, said sleeve member being adapted to interfit telescopically over said housing member with the second pair of slots therein interfitting with the second pair of pins in said housing member permitting said housing member to pivot relative to said sleeve member, said bearing member being adapted to be mounted in the support region of said housing member.

4. An apparatus as recited in claim 3, wherein said bearing member includes:

a plurality of roller members; and a ring-shaped outer race member having the exterior circumferential surface thereof engaging the interior circumferential surface of the support region in said housing member, said outer race member having a plurality of spaced open ended compartments disposed on the interior circumferential surface thereof and being adapted to receive said roller members therein with a portion thereof extending inwardly to engage the shaft member located therein, said outer race member having the compartments therein cooperating with said roller members to enable said roller members to rotate in one direction while preventing said roller members from rotating in the other direction when the shaft member is located therein.

5. An electrophotographic printing machine of the type having a drive system comprising at least a pair of rotary journaled shaft members adapted to be coupled to one another for unidirectional rotation substantially in unison, including:

means for coupling rotatably one of the shaft members to the other of the shaft members, said coupling means comprises a frame member arranged to be mounted on one of the shaft members, a sleeve member mounted pivotally on said frame member, a housing member mounted pivotably on said sleeve member, said housing member being adapted to pivot in a direction substantially normal to the direction said sleeve member pivots relative to said frame member, and biasing means for resiliently urging said frame member to be disposed in the region of one marginal edge portion of said sleeve member, while maintaining said housing member disposed in the region of the other marginal edge portion of said sleeve member; and means, cooperating with said coupling means, for enabling one of the shaft members to rotate relative to the other of the shaft members in one direction, while substantially preventing relative rotation therebetween in the other direction so that the pair of shaft members rotate in unison with one another.

6. A printing machine as recited in claim 5, wherein said enabling and preventing means includes a bearing member mounted in said housing member and adapted to receive the other shaft member therein, said bearing member being arranged to permit the pair of shaft members to rotate relative to one another in one direction, while coupling the pair of shaft members to rotate in unison with one another in the other direction.

7. A printing machine as recited in claim 6, wherein:

said frame member includes a substantially tubularly configured member having a first pair of substantially diametrically opposed pins extending in an outwardly direction from the circumferential surface thereof;

said sleeve member includes a substantially tubularly configured member adapted to interfit telescopically over said frame member, said sleeve member having a first pair of substantially diametrically opposed slots in the region of one marginal edge portion thereof arranged to interfit with the first pair of pins of said frame member permitting said frame member to pivot relative to said sleeve member, said sleeve member having a second pair of substantially diametrically opposed slots in a plane substantially normal to the plane of the first pair of slots in the region of the other marginal edge portion thereof; and said housing member includes a substantially tubularly configured member having a second pair of substantially diametrically opposed pins extending in an outwardly direction from the circumferential surface thereof, said sleeve member being adapted to interfit telescopically over said housing member with the second pair of slots therein interfitting with the second pair of pins in said housing member permitting said housing member to pivot relative to said sleeve member, said bearing member being adapted to be mounted in the support region of said housing member.

8. A printing machine as recited in claim 7, wherein said bearing member includes:

a plurality of roller members; and a ring-shaped outer race member having the exterior circumferential surface thereof enaging the interior circumferential surface of the support region in said housing member, said outer race member having a plurality of spaced open ended compartments disposed on the interior circumferential surface thereof and being adapted to receive said roller members therein with a portion thereof extending inwardly therefrom to engage the shaft members located therein, said outer race member having the compartments therein cooperating with said roller members to enable said roller members to rotate in one direction while preventing said roller members from rotating in the other direction when the shaft member is located therein.

* * * * *